US012148559B2

(12) United States Patent
Kobayashi et al.

(10) Patent No.: US 12,148,559 B2
(45) Date of Patent: Nov. 19, 2024

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takehito Kobayashi, Mie (JP); Kohei Yoshikawa, Mie (JP); Seiji Shitama, Mie (JP); Naotoshi Furukawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 818 days.

(21) Appl. No.: 17/292,827

(22) PCT Filed: Nov. 5, 2019

(86) PCT No.: PCT/JP2019/043325
§ 371 (c)(1),
(2) Date: May 11, 2021

(87) PCT Pub. No.: WO2020/100658
PCT Pub. Date: May 22, 2020

(65) Prior Publication Data

US 2021/0398728 A1 Dec. 23, 2021

(30) Foreign Application Priority Data

Nov. 14, 2018 (JP) ................................ 2018-213781

(51) Int. Cl.
*H01F 27/02* (2006.01)
*H01F 27/24* (2006.01)
(Continued)

(52) U.S. Cl.
CPC ........... *H01F 27/022* (2013.01); *H01F 27/24* (2013.01); *H01F 27/266* (2013.01); *H01F 27/28* (2013.01)

(58) Field of Classification Search
CPC ........ H01F 27/02; H01F 27/022; H01F 27/30; H01F 27/306; H01F 27/26; H01F 27/263; H01F 27/266; H01F 27/24; H01F 27/28
(Continued)

(56) References Cited

U.S. PATENT DOCUMENTS 10,283,255 B2 5/2019 Yoshikawa
2014/0125440 A1* 5/2014 Ueno ...................... H01F 27/06 336/65

FOREIGN PATENT DOCUMENTS

JP 2005183885 A * 7/2005
JP 2010118571 A * 5/2010
(Continued)

OTHER PUBLICATIONS

International Search Report issued on Feb. 18, 2020 for WO 2020/100658 A1 (4 pages).

*Primary Examiner* — Tszfung J Chan
(74) *Attorney, Agent, or Firm* — Venjuris, P.C.

(57) ABSTRACT

A reactor includes an assembly of a coil and a magnetic core, a case for accommodating the assembly inside, a sealing resin portion for at least partially sealing the assembly by being filled into the case, and a supporting portion to be fixed to the case in a cantilever manner. The case includes a bottom plate portion, and a side wall portion. The side wall portion includes a pair of short side portions and a pair of
(Continued)

long side portions having different lengths along a circumferential direction of the case. The supporting portion includes a fixed end to be fixed to an end surface of the short side portion of the side wall portion, an overlapping region configured to overlap the outer core portion from above, and a free end not to be fixed to the case.

12 Claims, 5 Drawing Sheets

(51) Int. Cl.
*H01F 27/26* (2006.01)
*H01F 27/28* (2006.01)

(58) Field of Classification Search
USPC .............................................. 336/83, 90, 96
See application file for complete search history.

(56) References Cited

FOREIGN PATENT DOCUMENTS

| | | | | | |
|---|---|---|---|---|---|
| JP | 2012227493 A | * | 11/2012 | | |
| JP | 2015050388 A | * | 3/2015 | | |
| JP | 2015222804 A | * | 12/2015 | | |
| JP | 2017028084 A | * | 2/2017 | | |
| JP | 2017108025 A | * | 6/2017 | ............. | H01F 27/02 |

* cited by examiner

REACTOR

CROSS REFERENCE TO RELATED APPLICATIONS

This application is a national phase of PCT application No. PCT/JP2019/043325, filed on 5 Nov. 2019, which claims priority from Japanese patent application No. 2018-213781, filed on 14 Nov. 2018, all of which are incorporated herein by reference.

TECHNICAL FIELD

The present disclosure relates to a reactor.

BACKGROUND

A reactor of Patent Document 1 includes a coil, a magnetic core, a case, a sealing resin portion, and two supporting portions. The case accommodates an assembly of the coil and the magnetic core inside. The case includes a bottom plate portion, a side wall portion and mounting bases. The assembly is placed on the bottom plate portion. The side wall portion surrounds the outer periphery of the assembly. The mounting bases are provided on four corner parts of the side wall portion. The supporting portions are mounted on the mounting bases. The coil includes a pair of winding portions. The pair of winding portions are so arranged side by side on the same plane of the bottom plate portion that the axes thereof are parallel to each other. That is, the pair of winding portions are horizontally placed on the same plane of the bottom plate portion. The magnetic core includes a pair of inner core portions and a pair of outer core portions. Each inner core portion is arranged inside each winding portion. Each outer core portion is arranged outside each winding portion. The sealing resin portion is filled into the case to seal the assembly. Each supporting portion supports the upper surface of each outer core portion via the sealing resin portion. Each supporting portion includes a pair of fixing portions and an overlapping region. The pair of fixing portions are provided on both ends in a longitudinal direction of the supporting portion, and fixed to the mounting bases of the case by bolts. The overlapping region is provided in a longitudinal central part of the supporting portion and overlaps the upper surface of the outer core portion. A part of the sealing resin portion is interposed between the lower surface of this overlapping region and the upper surface of the outer core portion.

PRIOR ART DOCUMENT

Patent Document

Patent Document 1: JP 2016-207701 A

SUMMARY OF THE INVENTION

Problems to be Solved

A first reactor according to the present disclosure includes an assembly of a coil and a magnetic core, a case for accommodating the assembly inside, a sealing resin portion for at least partially sealing the assembly by being filled into the case, and a supporting portion to be fixed to the case in a cantilever manner, wherein the case includes a bottom plate portion, the assembly being placed on the bottom plate portion, and a side wall portion in the form of a rectangular frame for surrounding an outer periphery of the assembly, the side wall portion includes a pair of short side portions and a pair of long side portions having different lengths along a circumferential direction of the case, the coil includes a pair of winding portions, the pair of winding portions are stacked in a direction orthogonal to the bottom plate portion and have axes parallel to each other, the magnetic core includes a pair of outer core portions to be arranged outside the coil, the supporting portion includes a fixed end to be fixed to an end surface of the short side portion of the side wall portion, an overlapping region configured to overlap the outer core portion from above, and a free end not to be fixed to the case, the overlapping region extends along the long side portions of the side wall portion, and the free end is provided on a side opposite to the fixed end.

A second reactor according to the present disclosure includes an assembly of a coil and a magnetic core, a case for accommodating the assembly inside, a sealing resin portion for at least partially sealing the assembly by being filled into the case, and a supporting portion to be fixed to the case in a cantilever manner, wherein the case includes a bottom plate portion, the assembly being placed on the bottom plate portion, and a side wall portion in the form of a rectangular frame for surrounding an outer periphery of the assembly, the side wall portion includes a pair of short side portions and a pair of long side portions having different lengths along a circumferential direction of the case, the coil includes a pair of winding portions, the pair of winding portions have axes orthogonal to the bottom plate portion and parallel to each other, the magnetic core includes a pair of outer core portions to be arranged outside the coil, the supporting portion includes a fixed end to be fixed to an end surface of the short side portion of the side wall portion, an overlapping region configured to overlap the outer core portion from above, and a free end not to be fixed to the case, the overlapping region extends along the long side portions of the side wall portion, and the free end is provided on a side opposite to the fixed end.

DETAILED DESCRIPTION TO EXECUTE THE INVENTION

Technical Problem

Figure 1:
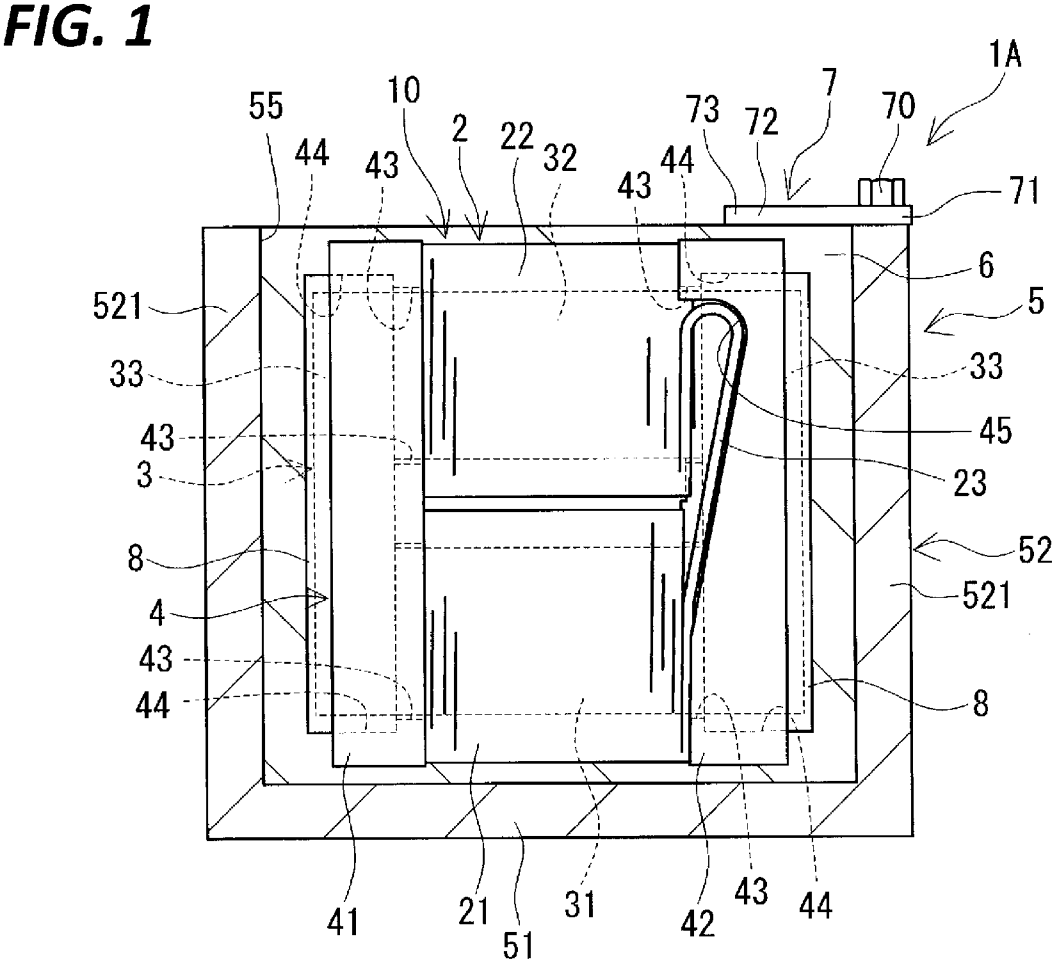
FIG. 1 is a side view schematically showing a reactor according to a first embodiment.

It is desired to suppress noise associated with vibration when an assembly operates while preventing the detachment of the assembly from a case by reducing an installation area of a reactor. This is because an installation space of the reactor is small and it may not be possible to horizontally place a pair of winding portions, depending on an installation object of the reactor. This is also because the assembly cannot be protected and cooled via the case if the assembly is detached from the case. Further, this is because noise increases if the vibration of the assembly is transmitted to the case via a supporting portion by both ends of the supporting portion being fixed to the case.

Accordingly, one object of the present disclosure is to provide a reactor which requires a small installation area, easily suppresses the detachment of an assembly from a case and easily suppresses noise associated with vibration when the assembly operates.

Effect of Present Disclosure

The first and second reactors according to the present disclosure have a small insulation area, easily suppress the detachment of the assembly from the case and easily suppress noise associated with vibration when the assembly operates.

Description of Embodiments of Present Disclosure

First, embodiments of the present disclosure are listed and described. In the following description, a pair of winding portions arranged side by side on the same plane of a bottom plate portion of a case and having axes parallel to each other may be called to be of a "horizontal placed type". Further, a pair of winding portions stacked in a direction orthogonal to the bottom plate portion of the case and having axes parallel to each other may be called of a "vertical stacked type". Furthermore, a pair of winding portions having axes orthogonal to the bottom plate portion of the case and parallel to each other may be called of an "upright type".

(1) A first reactor according to one aspect of the present disclosure includes an assembly of a coil and a magnetic core, a case for accommodating the assembly inside, a sealing resin portion for at least partially sealing the assembly by being filled into the case, and a supporting portion to be fixed to the case in a cantilever manner, wherein the case includes a bottom plate portion, the assembly being placed on the bottom plate portion, and a side wall portion in the form of a rectangular frame for surrounding an outer periphery of the assembly, the side wall portion includes a pair of short side portions and a pair of long side portions having different lengths along a circumferential direction of the case, the coil includes a pair of winding portions, the pair of winding portions are stacked in a direction orthogonal to the bottom plate portion and have axes parallel to each other, the magnetic core includes a pair of outer core portions to be arranged outside the coil, the supporting portion includes a fixed end to be fixed to an end surface of the short side portion of the side wall portion, an overlapping region configured to overlap the outer core portion from above, and a free end not to be fixed to the case, the overlapping region extends along the long side portions of the side wall portion, and the free end is provided on a side opposite to the fixed end.

The first reactor has a small installation area as compared to a pair of winding portions of the horizontally placed type by including the pair of winding portions of the vertically stacked type. Generally, this is because a length of the assembly along a direction orthogonal to both an axial direction of the coil and a parallel direction of the pair of winding portions is shorter than a length of the assembly along the parallel direction of the pair of winding portions. This relationship may be called a length relationship below.

Further, the first reactor easily suppresses the detachment of the assembly from the case. This is because the case for accommodating the pair of winding portions of the vertically stacked type tends to be deeper than a case for accommodating a pair of winding portions of the horizontally placed type since the above length relationship is satisfied as described above. Moreover, the protrusion of the assembly from the case can be restricted by including the supporting portion. Particularly, even if this supporting portion is fixed by being supported on the case in a cantilever manner, the detachment of the assembly from the case is easily suppressed. That is because the case is deep as described above and, in addition, the supporting portion is fixed to the end surface of not the long side portion, but the short side portion. A case where the supporting portion is fixed to the end surface of the short side portion and a case where the supporting portion is fixed to the end surface of the long side portion are compared with a width of the supporting portion set to be constant. A ratio "(the width of the supporting portion)/(the length of the short side portions)" is larger than a ratio "(the width of the supporting portion)/(the length of the long side portions)". Thus, the assembly is easily supported by the supporting portion. The width of the supporting portion means a length along a facing direction of the pair of long side portions. The length of the short side portions means a shortest distance between the inner surfaces of the pair of long side portions. The length of the long side portions means a shortest distance between the inner surfaces of the pair of short side portions.

Further, the first reactor easily suppresses noise associated with vibration when the assembly operates. The supporting portion functions as a leaf spring by being supported on the case in a cantilever manner. Thus, the vibration when the assembly operates is easily absorbed by the supporting portion. Therefore, the vibration when the assembly operates is hardly transmitted to the case via the supporting portion. Further, an opening of the case for accommodating the pair of winding portions of the vertically stacked type is smaller than an opening of a case for accommodating a pair of winding portions of the horizontally placed type. That is, an exposed region of the assembly from the case is small and a covered region of the assembly in the case is large. Thus, the assembly itself hardly vibrates. Further, the short side portions are higher in rigidity than the long side portions. Thus, by fixing the supporting portion to the short side portion, the supporting portion for preventing the detachment of the assembly can be firmly fixed to the case as compared to the case where the supporting portion is fixed to the long side portion.

The first reactor can reduce the number of components. If the pair of winding portions are of the horizontally placed type, two supporting portions and a total of four bolts, i.e. two bolts for each supporting portion, are required to suppress the detachment of the assembly from the case and noise. In contrast, the first reactor requires only one supporting portion and one bolt.

The first reactor can reduce a height by including the pair of winding portions of the vertically stacked type when the length of the assembly along the axial direction of the coil is longer than the length of the assembly along the parallel direction of the pair of winding portions as compared to the case where the pair of winding portions are of the upright type.

On the other hand, the first reactor can reduce the installation area thereof by including the pair of winding portions of the vertically stacked type when the length of the assembly along the parallel direction of the pair of winding portions is longer than the length of the assembly along the axial direction of the coil as compared to the case where the pair of winding portions are of the upright type. Moreover, the first reactor more easily suppresses the detachment of the assembly from the case. That is because the case for accommodating the pair of winding portions of the vertically stacked type is deeper than the case for accommodating the pair of winding portions of the upright type.

(2) A second reactor according to the present disclosure includes an assembly of a coil and a magnetic core, a case for accommodating the assembly inside, a sealing resin portion for at least partially sealing the assembly by being filled into the case, and a supporting portion to be fixed to the case in a cantilever manner, wherein the case includes a bottom plate portion, the assembly being placed on the bottom plate portion, and a side wall portion in the form of a rectangular frame for surrounding an outer periphery of the assembly, the side wall portion includes a pair of short side portions and a pair of long side portions having different lengths along a circumferential direction of the case, the coil includes a pair of winding portions, the pair of winding portions have axes orthogonal to the bottom plate portion and parallel to each other, the magnetic core includes a pair of outer core portions to be arranged outside the coil, the supporting portion includes a fixed end to be fixed to an end surface of the short side portion of the side wall portion, an overlapping region configured to overlap the outer core portion from above, and a free end not to be fixed to the case, the overlapping region extends along the long side portions of the side wall portion, and the free end is provided on a side opposite to the fixed end.

Similar to the first reactor, the second reactor has a small installation area, easily suppresses the detachment of the assembly from the case and easily suppresses noise. Moreover, the second reactor can reduce the number of components.

Particularly, the second reactor more easily suppresses noise as compared to the pair of winding portions of the vertically stacked type. The assembly easily vibrates in an axial direction of the coil. The second reactor can be so arranged that the supporting portion is orthogonal to the axial direction of the coil by including the pair of winding portions of the upright type. Thus, the supporting portion can support the assembly from a direction to suppress an amplitude of the assembly. Therefore, the vibration of the assembly is easily absorbed by the supporting portion.

The installation area of the second reactor is more easily reduced when a length of the assembly along the axial direction of the coil is longer than a length of the assembly along a parallel direction of the pair of winding portions as compared to the case where the pair of winding portions are of the vertically stacked type. Moreover, the second reactor more easily suppresses the detachment of the assembly from the case. That is because the case for accommodating the pair of winding portions of the upright type is deeper than the case for accommodating the pair of winding portions of the vertically stacked type.

On the other hand, the second reactor can reduce a height when the length of the assembly along the parallel direction of the pair of winding portions is longer than the length of the assembly along the axial direction of the coil as compared to the case where the pair of winding portions are of the vertically stacked type.

(3) As one aspect of the first reactor including the pair of winding portions of the vertically stacked type, the coil includes a connecting portion electrically connecting the pair of winding portions, the connecting portion is provided on one axial end side of the coil, and the fixed end of the supporting portion is fixed to the end surface of the short side portion located on the side of the connecting portion of the coil in the case.

The first reactor can prevent the mutual interference of both end parts of each winding wire in the pair of winding portions and the supporting portion. The both end parts of each winding wire in the pair of winding portions are provided on a side opposite to the connecting portion in the axial direction of the coil. That is, the both end parts of each winding wire in the pair of winding portions and the supporting portion provided on the side of the connecting portion are separated from each other.

Further, the first reactor is effective in suppressing noise. This is because the connecting portion side of the coil easily vibrates as compared to the side of the both end parts of each winding wire in the pair of winding portions. The both end parts hardly vibrates since being connected to an external device such as power supply via terminal members as described in detail later.

(4) As one aspect of the first or second reactor, the sealing resin portion is interposed between the overlapping region of the supporting portion and the outer core portion.

The reactor easily suppresses noise. This is because the transmission of the vibration of the magnetic core to the supporting portion is easily suppressed as compared to the case where the supporting portion is directly brought into contact with the outer core portion to press the outer core portion toward the bottom plate portion of the case. That is, the supporting portion hardly becomes a transmission path of the vibration of the magnetic core to the case.

(5) As one aspect of the first or second reactor, an adhesive layer is provided which fixes the assembly and the bottom plate portion of the case by being interposed between the assembly and the bottom plate portion of the case.

The reactor can firmly fix the assembly to the bottom plate portion. Thus, a movement of the assembly is easily restricted. Therefore, the detachment of the assembly from the case is easily suppressed.

(6) As one aspect of the first or second reactor, the assembly includes a molded resin portion for covering the outer core portions, and the molded resin portion extends to the insides of the pair of winding portions.

The reactor can integrate the outer core portions and the coil. Thus, the assembly is easily accommodated into the case in the manufacturing process of the reactor. That is because the assembly is easily handled.

Details of Embodiments of Present Disclosure

Embodiments of the present disclosure are described in detail with reference to the drawings below. The same components are denoted by the same reference signs in the drawings.

First Embodiment

[Reactor]

Figure 2:
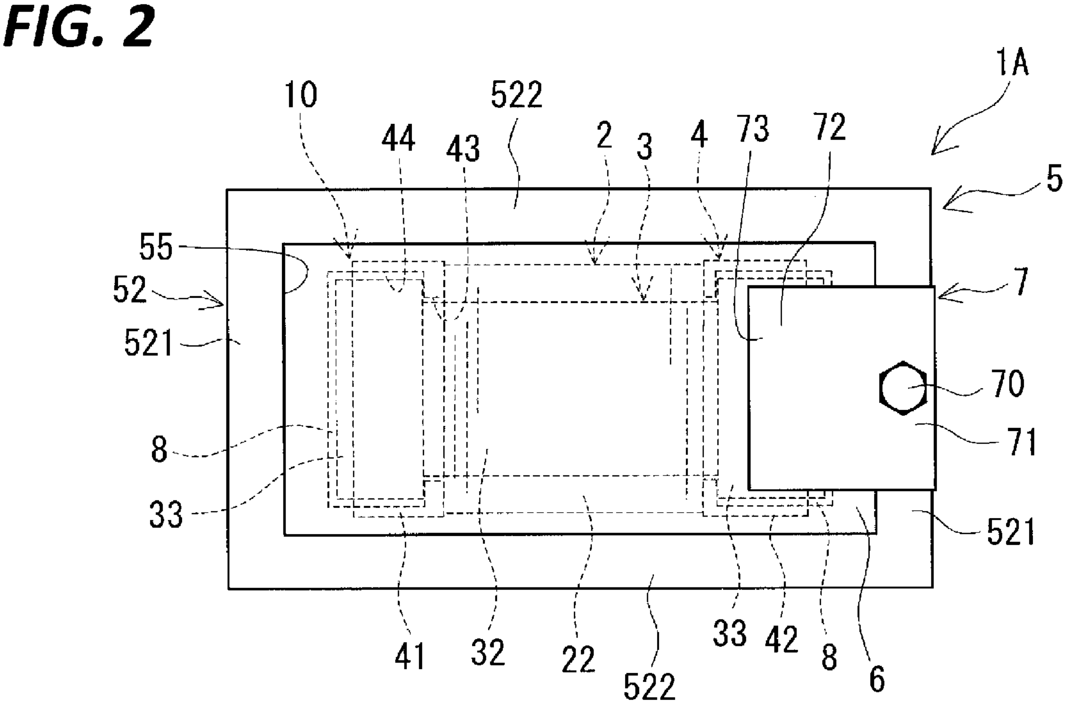
FIG. 2 is a top view schematically showing the reactor according to the first embodiment.

A reactor 1A according to a first embodiment is described with reference to FIGS. 1 and 2. The reactor 1A includes an assembly 10 as a combination of a coil 2 and a magnetic core 3, a case 5 and a sealing resin portion 6. The case 5 includes a bottom plate portion 51 on which the assembly 10 is to be placed, and a side wall portion 52 for surrounding the outer periphery of the assembly 10. The coil 2 includes a pair of winding portions 21, 22 (FIG. 1). The magnetic core 3 includes a pair of outer core portions 33 to be arranged outside the respective winding portions 21, 22. The sealing resin portion 6 at least partially seals the assembly 10 by being filled into the case 5. Some of features of the reactor 1A are that the pair of winding portions 21, 22 are not of the horizontally placed type, but of the vertically stacked type or upright right type and that a specific supporting portion 7 is provided to prevent the detachment of the assembly 10 from the case 5 by being fixed to the case 5. The configurations of main characteristic parts and parts relating to the characteristic parts, main effects and each component of the reactor 1A are successively described in detail below. In the following description, the side of the bottom plate portion 51 of the case 5 is referred to as a lower side and a side opposite to the bottom plate portion 51, i.e. the side of an opening 55, is referred to as an upper side. A direction along this vertical direction is a depth direction of the case 5. The vertical direction is along a vertical direction on the plane of FIG. 1. The direction along this vertical direction is referred to as a height direction.

[Configurations of Main Characteristic Parts and Relating Parts]

(Case)

The case 5 accommodates the assembly 10 inside. The case 5 can mechanically protect the assembly 10 and protect the assembly 10 from an external environment. The corrosion resistance of the assembly 10 is improved by protection from the external environment. Moreover, the case 5 dissipates the heat of the assembly 10. The case 5 is typically produced by mold casting such as die casting or injection molding. The case 5 is a bottomed tubular container. The case 5 includes the bottom plate portion 51 and the side wall portion 52. The bottom plate portion 51 and the side wall portion 52 are integrally molded in this example. Note that the bottom plate portion 51 and the side wall portion 52 may be individually molded. In that case, the bottom plate portion 51 and the side wall portion 52 are integrated with each other, such as by screwing. The opening 55 is formed on an upper end side of the side wall portion 52. The upper end side of the side wall portion 52 is a side opposite to the bottom plate portion 51. An internal space surrounded by the bottom plate portion 51 and the side wall portion 52 is so shaped and dimensioned as to be able to accommodate the entire assembly 10.

<Bottom Plate Portion>

The bottom plate portion 51 has an inner bottom surface and an outer bottom surface. The assembly 10 is placed on the inner bottom surface. The outer bottom surface is installed on an installation object such as a cooling base. The installation object is not shown. The bottom plate portion 51 is in the form of a rectangular flat plate. The inner bottom surface and the outer bottom surface are formed by flat surfaces in this example.

<Side Wall Portion>

The side wall portion 52 surrounds the outer periphery of the assembly 10. The side wall portion 52 stands on the peripheral edge of the bottom plate portion 51. A height of the side wall portion 52 is larger than that of the assembly 10. The side wall portion 52 has a rectangular frame shape in this example. That is, the side wall portion 52 has four wall portions. The side wall portion 52 includes a pair of short side portions 521 and a pair of long side portions 522. The pair of short side portions 521 and the pair of long side portions 522 differ in length along a circumferential direction of the case 5. The length of the pair of short side portions 521 along the circumferential direction of the case 5 is shorter than that of the long side portions 522 along the circumferential direction of the case 5. The short side portions 521 and the long side portions 522 are alternately arranged in the circumferential direction of the case 5. The pair of short side portions 521 are facing each other. The pair of long side portions 522 are facing each other. A facing direction of the pair of short side portions 521 and that of the pair of long side portions 522 are orthogonal to each other. In FIG. 1, the long side portion on a side forward of the plane of FIG. 1 is not shown for the sake of description.

An end surface of the short side portion 521 on the side of a later-described connecting portion 23 of the coil 2 (right side of FIG. 1), out of the pair of short side portions 521, is formed by a flat surface. A screw hole is formed in the end surface of this short side portion 521 on the side of the connecting portion 23. The screw hole is not shown. A bolt 70 for fixing the supporting portion 7 is tightened into this screw hole. The short side portions 521 are higher in rigidity than the long side portions 522. Thus, by fixing the supporting portion 7 to the short side portion 521, the supporting portion 7 for preventing the detachment of the assembly 10 can be firmly fixed to the case 5 as compared to the case where the supporting portion 7 is fixed to the long side portion 522. If the side wall portion 52 is thickened to provide a screw hole, the size and weight of the case 5 are less likely to increase when the short side portion 521 is thickened as compared to the case where the long side portion 522 is thickened.

<Material>

Examples of the material of the case 5 include non-magnetic metals and non-metals.

Examples of the non-magnetic metals include aluminum, aluminum alloy, magnesium, magnesium alloy, silver and silver alloy and austenitic stainless steel. These non-magnetic metals are relatively high in thermal conductivity. Thus, the case 5 can be utilized as a heat dissipation path. Therefore, the case 5 can efficiently dissipate heat generated in the assembly 10 to the installation object such as the cooling base. Hence, the reactor 1A is improved in heat dissipation. If the case 5 is made of metal, die casting is preferable as a method for forming the case 5.

Examples of the non-metals include resins such as a polybutylene terephthalate (PBT) resin, a urethane resin, a polyphenylene sulfide (PPS) resin and an acrylonitrile-butadiene-styrene (ABS) resin. These non-metals are generally excellent in electrical insulation in many cases. Thus, insulation between the coil 2 and the case 5 is high. These non-metals are lighter than the aforementioned metals and can make the reactor 1A lighter in weight.

The above resins may contain a ceramic filler. Examples of the ceramic filler include alumina and silica. These resins containing the ceramic filler are excellent in heat dissipation and electrical insulation. If the case 5 is made of resin, injection molding is preferable as the method for forming the case 5. If the bottom plate portion 51 and the side wall portion 52 are individually molded, the bottom plate portion 51 and the side wall portion 52 may be made of mutually different materials.

(Coil)

The pair of winding portions 21, 22 provided in the coil 2 are hollow tubular bodies formed by spirally winding one winding wire having no joint in this example. More specifically, the pair of winding portions 21, 22 are rectangular tubular bodies. The pair of winding portions 21, 22 are electrically connected to each other via the connecting portion 23 on one axial end side (right side on the plane of FIG. 1) of the coil 2. The connecting portion 23 is formed by bending a part of the winding wire into a U shape.

Note that the pair of winding portions 21, 22 may be formed by spirally winding separate winding wires. The connecting portion for electrically connecting the pair of winding portions 21, 22 to each other can be, for example, formed as follows. Conductors of the winding wires in the pair of winding portions 21, 22 are directly connected to each other. Alternatively, a coupling member independent of the pair of winding portions 21, 22 is connected to the conductors of the winding wires in the pair of winding portions 21, 22. In the case of directly connecting the conductors to each other, an end side of the winding wire in one winding portion 21 is bent and drawn out toward an end side of the winding wire in the other winding portion 22. The coupling member is, for example, formed by the same member as the winding wire. The conductors are connected to each other and the coupling member and the conductors are connected by welding or insulation displacement.

Both end parts of each winding wire on the other axial end side (left side on the plane of FIG. 1) of the coil 2 are drawn out upward from the opening 55 of the case 5. The both end parts of each winding wire are not shown. In the both end parts of each winding wire, an insulation coating is stripped to expose the conductor. Terminal members are connected to the exposed conductors. The coil 2 is connected to an external device such as a power supply via these terminal members. The power supply supplies power to the coil 2. The terminal members and the external device are not shown.

A coated wire can be utilized as each winding wire constituting the pair of winding portions 21, 22. The coated wire includes a conductor wire and an insulation coating covering the outer periphery of the conductor wire. Examples of the material of the conductor wire include copper, aluminum, magnesium and alloys of those. Examples of the type of the conductor wire include flat rectangular wires and round wires. Examples of the insulation coating include enamel. Enamel is typically polyamide-imide. A coated flat rectangular wire in which a conductor wire is a flat rectangular wire made of copper and an insulation coating is made of enamel is used as each winding wire of this example. Each winding portion 21, 22 is formed by an edge-wise coil formed by winding this coated flat rectangular wire in an edge-wise manner. Cross-sectional areas of the winding wires of the pair of the winding portions 21, 22 are equal to each other in this example. Winding directions of the pair of winding portions 21, 22 are the same direction. The numbers of turns of the pair of winding portions 21, 22 are equal. Note that the cross-sectional areas and the numbers of turns of the winding wires of the pair of winding portions 21, 22 may be different from each other.

End surfaces of the pair of winding portions 21, 22 have rectangular frame shapes. The rectangular frame shapes mentioned here include square frame shapes. Corner parts of each winding portion 21, 22 are rounded. Note that the end surfaces of the pair of winding portions 21, 22 may have trapezoidal frame shapes. Examples of the trapezoidal frame shapes include isosceles trapezoidal shapes and right-angle trapezoidal shapes. The trapezoidal frame shapes are not shown.

Heights and widths of the pair of winding portions 21, 22 are equal to each other in this example. This width is a length along a direction (vertical direction on the plane of FIG. 2) orthogonal to both the height direction and an axial direction of the coil 2. Note that the heights of the pair of winding portions 21, 22 may be different from each other.

Figure 4:
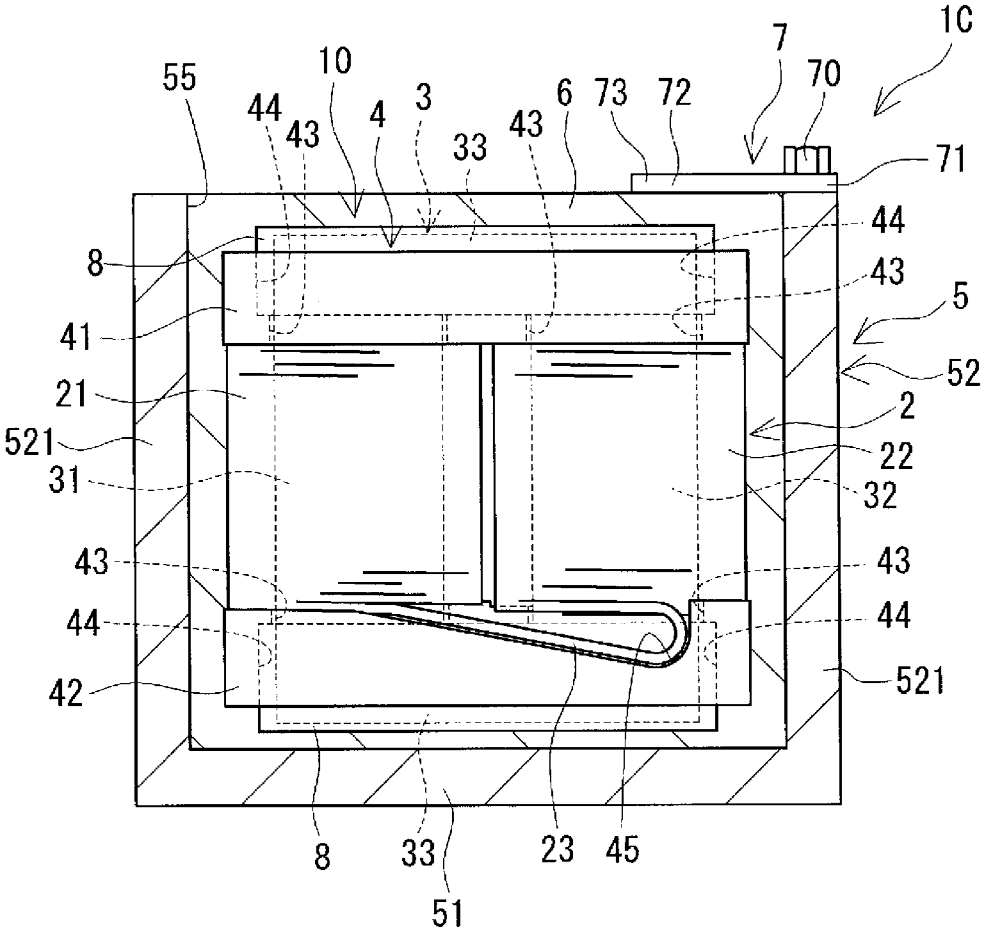
FIG. 4 is a side view schematically showing a reactor according to a third embodiment.

The arrangement mode of the pair of winding portions 21, 22 is not a horizontally placed type, but a vertically stacked type (FIG. 1) or an upright right (FIG. 4). The horizontally placed type means an arrangement in which the pair of winding portions 21, 22 are placed side by side on the same plane of the bottom plate portion 51 so that the axes thereof are parallel to each other. The vertically stacked type means the stacking of the pair of winding portions 21, 22 in a direction orthogonal to the bottom plate portion 51 so that the axes thereof are parallel to each other. The upright type means an arrangement in which the axes of the pair of winding portions 21, 22 are parallel to each other and orthogonal to the bottom plate portion 51. That the axes are parallel does not include a case where the axes are on the same straight line. Since the arrangement mode of the pair of winding portions 21, 22 is the vertically stacked type or the upright type, an installation space of the reactor 1A can be reduced as compared to the case where the arrangement mode of the pair of winding portions 21, 22 is the horizontally placed type.

In this example, the arrangement mode of the pair of winding portions 21, 22 is the vertically stacked type. One winding portion 21 is arranged on the side of the bottom plate portion 51. The other winding portion 22 is arranged above the one winding portion 21, i.e. on the side of the opening 55. Out of four peripheral surfaces of the lower winding portion 21, three outer peripheral surfaces except a facing surface facing the upper winding portion 22 are facing the case 5. Specifically, the above three outer peripheral surfaces are facing the bottom plate portion 51 and the pair of long side portions 522. Out of four outer peripheral surfaces of the upper winding portion 22, two outer peripheral surfaces except a facing surface facing the lower winding portion 21 and an upper surface are facing the case 5. Specifically, the above two outer peripheral surfaces are facing the pair of long side portions 522. Since facing surfaces facing the case 5 are a total of five outer peripheral surfaces, out of a total of eight outer peripheral surfaces of the pair of winding portions 21, 22, the heat of the coil 2 is easily dissipated via the case 5.

(Magnetic Core)

The magnetic core 3 includes a pair of inner core portions 31, 32 and a pair of outer core portions 33 (FIG. 1). The pair of inner core portions 31, 32 are respectively arranged inside the pair of winding portions 21, 22. The pair of inner core portions 31, 32 are arranged apart from each other. The pair of outer core portions 33 are arranged outside the pair of winding portions 21, 22. That is, the coil 2 is not arranged in the outer core portions 33 and the outer core portions 33 project from the coil 2 and are exposed from the coil 2. The magnetic core 3 is configured such that the pair of outer core portions 33 are arranged across the pair of inner core portions 31, 32 arranged apart from each other. The magnetic core 3 is formed into an annular shape by bringing the end surfaces of the respective inner core portions 31, 32 and the inner end surfaces of the outer core portions 33 into contact. By the pair of inner core portions 31, 32 and the pair of outer core portions 33, a closed magnetic path is formed when the coil 2 is excited. Note that the pair of inner core portions 31, 32 mean parts of the magnetic core 3 along axial directions of the pair of winding portions 21, 22. In this example, both end parts of a part of the magnetic core 3 along the axial directions of the respective winding portions 21, 22 project outward of the respective winding portions 21, 22. Those projecting parts are also parts of the respective inner core portions 31, 32.

<Inner Core Portions>

Each inner core portion 31, 32 is so arranged that the axis thereof is parallel to the bottom plate portion 51 and the long side portions 522 of the side wall portion 52. That is, each inner core portion 31, 32 is so arranged that the axis thereof is orthogonal to the short side portions 521 of the side wall portion 52. Each inner core portion 31, 32 is preferably shaped in conformity with the inner peripheral shape of each winding portion 21, 22. That is because intervals between the inner peripheral surfaces of each winding portion 21, 22 and the outer peripheral surfaces of each inner core portion 31, 32 are easily made uniform over a circumferential direction of each inner core portion 31, 32. In this example, each inner core portion 31, 32 has a rectangular parallelepiped shape. Corner parts of each inner core portion 31, 32 are rounded to extend along the inner peripheral surfaces of corner parts of each winding portion 21, 22.

Heights and widths of the pair of inner core portions 31, 32 are equal to each other in this example. That is, the sizes of the intervals between the inner peripheral surfaces of the respective winding portions 21, 22 and the outer peripheral surfaces of the respective inner core portions 31, 32 are equal to each other. This width is a length along a width direction (vertical direction on the plane of FIG. 2) of the pair of winding portions 21, 22.

Each inner core portion 31, 32 is constituted by one column-like core piece. The core piece has a length equal to substantially the entire axial length of each winding portion 21, 22 without via any gap. Note that each inner core portion 31, 32 may be constituted by a laminate in which a plurality of column-like core pieces and gaps are arranged one after another along the axial direction of the coil 2.

<Outer Core Portions>

Each outer core portion 33 is so arranged that the outer end surface thereof faces the corresponding short side portion 521 of the side wall portion 52 of the case 5. The outer end surface of the outer core portion 33 means a surface of the outer core portion 33 opposite to the pair of inner core portions 31, 32. The outer core portions 33 have, for example, a rectangular parallelepiped shape.

The upper surface of the outer core portion 33 is substantially flush with the upper surface of the upper inner core portion 32 in this example. The lower surface of the outer core portion 33 is substantially flush with the lower surface of the lower inner core portion 31 in this example. Note that the upper surface of the outer core portion 33 may be located above the upper surface of the upper inner core portion 32. The lower surface of the outer core portion 33 may be located below the lower surface of the lower inner core portion 31. Each outer core portion 33 is constituted by one column-like core piece.

(Sealing Resin Portion)

The sealing resin portion 6 at least partially covers the assembly 10 by being filled into the case 5. The sealing resin portion 6 has various functions described in (a) to (d) below.

(a) A function of transferring the heat of the assembly 10 to the case 5. (b) A function of mechanically protecting the assembly 10 and protecting the assembly 10 from an external environment. The corrosion resistance of the assembly 10 is improved by protection from the external environment. (c) A function of improving electrical insulation between the assembly 10 and the case 5. (d) A function of improving the strength and rigidity of the reactor 1A by the integration of the assembly 10 and the case 5.

The sealing resin portion 6 of this example is substantially filled up to an opening end of the case 5. That is, the upper surface of the sealing resin portion 6 is substantially flush with the end surface of the side wall portion 52 of the case 5. The entire assembly 10 is embedded in the sealing resin portion 6. This sealing resin portion 6 includes a part interposed between the assembly 10 and the supporting portion 7, a part interposed between the coil 2 and the case 5 and a part interposed between the winding portions 21 and 22. Specifically, the sealing resin portion 6 is interposed in entire regions between the upper surface of the outer core portion 33 and the lower surface of the supporting portion 7 and between the upper surface of a later-described second end surface member 42 and the lower surface of the supporting portion 7. Further, the sealing resin portion 6 is interposed between the lower surface of the lower winding portion 21 and the inner bottom surface of the bottom plate portion 51, between the side surfaces of the lower winding portion 21 and the long side portions 522 of the side wall portion 52 and between the side surfaces of the upper winding portion 22 and the long side portions 522. Furthermore, the sealing resin portion 6 is interposed between the upper surface of the lower winding portion 21 and the lower surface of the upper winding portion 22.

The higher the thermal conductivity of the sealing resin portion 6, the more preferable. That is because the heat of each winding portion 21, 22 is easily transferred to the case 5. The thermal conductivity of the sealing resin portion 6 is, for example, preferably 0.3 W/m·K or higher, more preferably 1 W/m·K or higher and particularly preferably 2 W/m·K or higher. Examples of the material of the sealing resin portion 6 include thermosetting resins and thermoplastic resins. The thermosetting resins are, for example, an epoxy resin, a urethane resin, a silicone resin, an unsaturated polyester resin and the like. The thermoplastic resins are, for example, a PPS resin and the like. These resins may contain the aforementioned ceramic filler and the like.

(Supporting Portion)

The supporting portion 7 is fixed to the case 5 to support the assembly 10 from above. By the support of the assembly 10 by the supporting portion 7, the detachment of the assembly 10 from the case 5 is prevented. The supporting portion 7 may directly support the assembly 10 by being brought into direct contact with the assembly 10, but preferably indirectly supports the assembly 10 via the sealing resin portion 6 cured between the supporting portion 7 and the assembly 10. That is because the transmission of the vibration of the assembly 10 to the supporting portion 7 is easily suppressed by the sealing resin portion 6 interposed between the supporting portion 7 and the assembly 10. In this example, the supporting portion 7 indirectly supports the assembly 10 via the sealing resin portion 6. That is, the sealing resin portion 6 is interposed between the supporting portion 7 and the assembly 10. The supporting portion 7 is so provided that a longitudinal direction thereof extends along the long side portions 522. The supporting portion 7 is in the form of a cantilever having a fixed end 71, an overlapping region 72 and a free end 73.

<Fixed End>

The fixed end 71 is fixed to the end surface of the short side portion 521 in the side wall portion 52 of the case 5. By fixing the fixed end 71 to the short side portion 521, the vibration of the supporting portion 7 itself is less likely to be transmitted to the short side portion 521 as compared to the case where the fixed end 71 is fixed to the long side portion 522. That is because the rigidity of the short side portion 521 is higher than that of the long side portion 522. The fixed end 71 is preferably fixed to the end surface of the short side portion 521 on the side of the connecting portion 23 of the coil 2, out of the pair of short side portions 521. That is because the both end parts of the other end side of the coil 2 drawn out upward from the opening 55 of the case 5 and the supporting portion 7 do not interfere with each other. Further, noise is effectively suppressed. That is because the side of the connecting portion 23 of the coil 2 easily vibrates as compared to the both end sides of each winding wire in the pair of winding portions 21, 22. The both end parts hardly vibrate since being connected to the external device such as the power supply via the terminal members as described above. The bolt 70 can be utilized to fix the fixed end 71. An insertion hole through which the bolt 70 is inserted is formed in the fixed end 71. The insertion hole is not shown.

<Overlapping Region>

The overlapping region 72 overlaps the outer core portion 33 from above. The overlapping region 72 extends along a longitudinal direction of the long side portions 522 of the side wall portion 52. This overlapping region 72 is provided between the fixed end 71 and the free end 73. The free end 73 is described later. In this example, the overlapping region 72 overlaps the second end surface member 42 covering the upper surface of the outer core portion 33 from above. The second end surface member 42 is described later. The cured sealing resin portion 6 is interposed between the lower surface of the overlapping region 72 and the upper surface of the second end surface member 42 and between the lower surface of the overlapping region 72 and the upper surface of the outer core portion 33. Thus, the lower surface of the overlapping region 72 and the upper surface of the second end surface member 42 are not directly in contact. Further, the lower surface of the overlapping region 72 and the upper surface of the outer core portion 33 are not directly in contact. The lower surface of the overlapping region 72 is in contact with the upper surface of the sealing resin portion 6. That is, the overlapping region 72 is not embedded in the sealing resin portion 6. Note that the overlapping region 72 may be embedded in the sealing resin portion 6. The lower surface of the overlapping region 72 and the upper surface of the second end surface member 42 may be directly in contact. The lower surface of the overlapping region 72 and the upper surface of the outer core portion 33 may be directly in contact.

<Free End>

The free end 73 is not fixed to the case 5. The free end 73 is provided on a side opposite to the fixed end 71 in the longitudinal direction of the supporting portion 7. The free end 73 overlaps the second end surface member 42 from above in this example. Note that the free end 73 may overlap the coil 2 from above, depending on an overlapping position of the overlapping region 72. The cured sealing resin portion 6 is interposed between the lower surface of the free end 73 and the upper surface of the second end surface member 42. Thus, the lower surface of the free end 73 and the upper surface of the second end surface member 42 are not directly in contact. The lower surface of the free end 73 is in contact with the upper surface of the sealing resin portion 6. That is, the free end 73 is not embedded in the sealing resin portion 6. Note that the free end 73 may be embedded in the sealing resin portion 6.

<Width>

The larger the width of the supporting portion 7, the more preferable. That is because a ratio "(the width of the supporting portion 7)/(the length of the short side portions 521)" can be made larger and the detachment of the assembly 10 from the case 5 is more easily suppressed. The width of the supporting portion 7 means a length along the facing direction (vertical direction on the plane of FIG. 2) of the short side portions 521. The length of the short side portions 521 means a minimum distance between the inner surfaces of the pair of long side portions 522. A case where the supporting portion 7 is fixed to the end surface of the short side portion 521 and a case where the supporting portion 7 is fixed to the end surface of the long side portion 522 are compared with the width of the supporting portion 7 set to be constant. The ratio "(the width of the supporting portion 7)/(the length of the short side portions 521)" is larger than a ratio "(the width of the supporting portion 7)/(the length of the long side portions 522)". Thus, even if the supporting portion 7 is supported in a cantilever manner, the supporting portion 7 easily supports the assembly 10. Therefore, the detachment of the assembly 10 is effectively suppressed. The length of the long side portions 522 means a shortest distance between the inner surfaces of the pair of short side portions 521. In this example, the width of the supporting portion 7 is larger than that of the inner core portion 32 and smaller than that of the outer core portions 33. Note that the width of the supporting portion 7 may be larger than the width of the outer core portions 33.

<Shape>

The supporting portion 7 is in the form of such a flat plate that the fixed end 71, the overlapping region 72 and the free end 73 are substantially parallel to the end surface of the short side portion 521 and have no bent part. By forming the supporting portion 7 by a flat plate, a clearance of a predetermined interval for interposing the sealing resin portion 6 between the upper surface of the outer core portion 33 and the lower surface of the overlapping region 72 of the supporting portion 7 is easily formed in accommodating the assembly 10 into the case 5 and mounting the fixed end 71 of the supporting portion 7 on the end surface of the short side portion 521. That is because the height of the side wall portion 52 is larger than that of the assembly 10. Here, the lower surface of the supporting portion 7 is located above the upper surface of the second end surface member 42 and the upper surface of the outer core portion 33. Note that, if the upper surface of the side wall portion 52 is sufficiently higher than the upper surface of the sealing resin portion 6, the supporting portion 7 can be in the form of a Z-shaped plate bent in a stepped manner so that the overlapping region 72 and the free end 73 are lower than the fixed end 71.

<Material>

The supporting portion 7 may be made of non-metal, but preferably made of metal. That is because the fixed end 71 of the supporting portion 7 can be firmly fixed to the case 5 made of metal if the supporting portion 7 is made of metal. Thus, the supporting portion 7 easily suppresses the detachment of the assembly 10 from the case 5. Moreover, the supporting portion 7 easily absorbs vibration when the assembly 10 operates. Thus, the vibration when the assembly 10 operates is hardly transmitted to the case 5 via the supporting portion 7. Therefore, noise associated with the vibration of the assembly 10 is easily suppressed. Examples of non-metals include those described in the section on the material of the case 5. The metal may be one of the non-magnetic metals described in the section on the material of the case 5. The metal is particularly preferably spring steel.

[Sizes]

A volume of the reactor 1A is 250 $cm^3$ or more and 1450 $cm^3$ or less. A height of the reactor 1A is, for example, 80 mm or more and 150 mm or less. A width of the reactor 1A is, for example, 80 mm or more and 120 mm or less. The width of the reactor 1A is a length along the long side portions 522. A depth of the reactor 1A is, for example, 40 mm or more and 80 mm or less. The depth of the reactor 1A is a length along the short side portions 521. In this example, a relationship of "(the depth of the reactor 1A)<(the width of the reactor 1A)<(the height of the reactor 1A)" is satisfied. That is, in this example, a relationship of "(the length of the assembly 10 along the depth direction)<(the length of the assembly 10 along the width direction)<(the length of the assembly 10 along the height direction)" is satisfied.

[Functions and Effects in Main Characteristic Parts of Reactor]

The reactor 1A according to the first embodiment can provide the following effects.

(1) Since the pair of winding portions 21, 22 are of the vertically stacked type, the installation area of the reactor 1A can be reduced as compared to the case where the pair of winding portions 21, 22 are of the horizontally placed type. That is because the length of the assembly 10 along the depth direction is shorter than the length of the length of the assembly 10 along the height direction.

Particularly, the installation area of the reactor 1A can be reduced as compared to a reactor 1C (FIG. 4) according to a third embodiment to be described later in which a pair of winding portions 21, 22 are of the upright type. That is because the length of the assembly 10 along the width direction is shorter than the length of the length of the assembly 10 along the height direction.

(2) The detachment of the assembly 10 from the case 5 can be suppressed. The reason for that is as follows. The length of the assembly 10 along the depth direction is shorter than the length of the length of the assembly 10 along the height direction. Thus, the case 5 for accommodating the pair of winding portions 21, 22 of the vertically stacked type is easily deeper than a case for accommodating a pair of winding portions of the horizontally placed type. Moreover, the protrusion of the assembly 10 from the case 5 can be suppressed by including the supporting portion 7. Particularly, even if this supporting portion 7 is fixed to the case 5 in a cantilever manner, the detachment of the assembly 10 from the case 5 is easily suppressed. That is because the case 5 is deep as described above and, in addition, the supporting portion 7 is fixed not on the end surface of the long side portion 522, but on the end surface of the short side portion 521. If a case where the supporting portion 7 is fixed to the end surface of the short side portion 521 and a case where the supporting portion 7 is fixed to the end surface of the long side portion 522 are compared with the width of the supporting portion 7 set to be constant, the ratio "(the width of the supporting portion 7)/(the length of the short side portions 521)" is larger than the ratio "(the width of the supporting portion 7)/(the length of the long side portions 522). Thus, the supporting portion 7 easily supports the assembly 10.

Particularly, the detachment of the assembly 10 from the case 5 is easily suppressed as compared to the reactor 1C according to the third embodiment to be described later. The reason for that is as follows. The length of the assembly 10 along the width direction is shorter than the length of the length of the assembly 10 along the height direction. Thus, the case 5 (FIG. 1) for accommodating the pair of winding portions 21, 22 of the vertically stacked type is deeper than a case 5 (FIG. 4) of the reactor 1C according to the third embodiment in which a winding portions 21, 22 of the upright type are accommodated.

(3) Noise associated with the vibration of the assembly 10 is easily suppressed. The reason for that is as follows. The supporting portion 7 functions as a leaf spring by being supported on the case 5 in a cantilever manner. Thus, vibration when the assembly 10 operates is easily absorbed by the supporting portion 7. Further, the supporting portion 7 is fixed not on the long side portion 522, but on the short side portion 521. The short side portion 521 is higher in rigidity than the long side portion 522. Thus, by fixing the supporting portion 7 to the short side portion 521, the supporting portion 7 can be firmly fixed to the case 5 as compared to the case where the supporting portion 7 is fixed to the long side portion 522. Further, by interposing the sealing resin portion 6 between the supporting portion 7 and the assembly 10, the transmission of the vibration of the assembly 10 to the supporting portion 7 is easily suppressed as compared to the case where the supporting portion 7 is directly brought into contact with the assembly 10 to press the assembly 10 toward the bottom plate portion 51 of the case 5. Thus, the supporting portion 7 hardly becomes a transmission path of the vibration during the operation of the assembly 10 to the case 5. The length of the assembly 10 along the depth direction is shorter than the length of the assembly 10 along the height direction. Thus, an opening area of the case 5 is smaller than an opening area of a case for accommodating a pair of winding portions of the horizontally placed type. That is, an exposed region of the assembly 10 from the case 5 is small and a covered region of the assembly 10 in the case 5 is large. Therefore, the assembly 10 itself hardly vibrates.

Particularly, the assembly 10 itself is less likely to vibrate as compared to the reactor 1C according to the third embodiment. The reason for that is as follows. The length of the assembly 10 along the width direction is shorter than the length of the length of the assembly 10 along the height direction. Thus, the opening area of the case 5 is smaller than an opening area of the case 5 (FIG. 4) of the reactor 1C according to the third embodiment. Thus, noise is easily suppressed.

(4) The number of components can be reduced. That is because one supporting portion 7 and one bolt 70 are required to suppress the detachment of the assembly 10 from the case 5 and noise.

(5) Heat dissipation is excellent as compared to the pair of winding portions 21, 22 of the horizontally placed type. That is because many outer peripheral surfaces of the pair of winding portions 21, 22 are the facing surfaces facing the case 5. In the pair of winding portions 21, 22 of the horizontally placed type, the facing surfaces facing the case 5, out of the four outer peripheral surfaces of each winding portion 21, 22, are two surfaces, i.e. the surface opposite to the surface facing the opposite winding portion 22, 21 and the facing surface facing the bottom plate portion 51. That is, out of the outer peripheral surfaces (a total of eight surfaces) of the pair of winding portions 21, 22, the facing surfaces facing the case 5 are a total of four surfaces. In contrast, in the pair of winding portions 21, 22 of the vertically stacked type, the facing surfaces facing the case 5 are a total of five surfaces as described above.

[Description of Each Component Including Other Characteristic Parts]

(Coil)

The respective winding portions 21, 22 may be individually integrated by integrated resin. The integrated resin is not shown. The integrated resin covers the outer peripheral surfaces, inner peripheral surfaces and end surfaces of the respective winding portions 21, 22 and joins adjacent turns. The integrated resin can be formed by, after winding a winding wire further including a coating layer made of thermally fusible resin formed on the outer periphery of the winding wire, i.e. on the outer periphery of an insulation coating, heating and melting the coating layer. The type of the thermally fusible resin is, for example, a thermosetting resin such as an epoxy resin, a silicone resin or an unsaturated polyester.

(Magnetic Core)

<Material>

The pair of inner core portions 31, 32 and the pair of outer core portions 33 are constituted by powder compacts or composite materials. The powder compact is formed by compression-molding a soft magnetic powder. The powder compact can enhance a ratio of the soft magnetic powder in a core piece as compared to composite materials. Thus, the powder compact easily enhances magnetic characteristics. Examples of the magnetic characteristics include relative magnetic permeability and saturation magnetic flux density. The composite material is obtained by dispersing a soft magnetic powder in a resin. The composite material is obtained by filling a fluid raw material, in which the soft magnetic powder is dispersed in the uncured resin, into a mold and curing the resin. The composite material can easily adjust the content of the soft magnetic powder in the resin. Thus, the composite material easily adjusts the magnetic characteristics. Moreover, the composite material is easily shaped, even if the shape is complicated, as compared to the powder compacts. Note that the pair of inner core portions 31, 32 and the pair of outer core portions 33 can be hybrid cores in each of which the outer periphery of a powder compact is covered by a composite material. In this example, the pair of inner core portions 31, 32 are made of the composite material. Further, the pair of outer core portions 33 are constituted by the powder compacts.

Examples of particles constituting the soft magnetic powder include particles of soft magnetic metals, coated particles each including an insulation coating on the outer periphery of a soft magnetic metal particle, and particles of soft magnetic non-metals. Examples of the soft magnetic metals include pure iron and iron-based alloys. The iron-based alloys are, for example, a Fe—Si alloy, a Fe—Ni alloy and the like. Examples of the insulation coating include a phosphate. Examples of the soft magnetic non-metals include ferrite. For example, a thermosetting resin or thermoplastic resin can be utilized as the resin of the composite material. The thermosetting resin is, for example, an epoxy resin, a phenol resin, a silicone resin, a urethane resin or the like. The thermoplastic resin is, for example, a PPS resin, a polyamide (PA) resin, a liquid crystal polymer (LCP), a polyimide resin, a fluororesin or the like. The PA resin is, for example, nylon 6, nylon 66, nylon 9T or the like. These resins may contain the aforementioned ceramic filler. Gaps are made of a material having a lower relative magnetic permeability than the pair of inner core portions 31, 32 and the pair of outer core portions 33.

(Holding Member)

The assembly 10 may further include a holding member 4 (FIG. 1). The holding member 4 ensures insulation between the coil 2 and the magnetic core 3. The holding member 4 of this example includes a first end surface member 41 (left side on the plane of FIG. 1) and the second end surface member 42 (right side on the plane of FIG. 1).

<First End Surface Member, Second End Surface Member>

The first and second end surface members 41, 42 ensure insulation between the end surfaces of the coil 2 and the outer core portions 33. The first end surface member 41 is arranged on the side of the both end parts of each winding wire in the coil 2, i.e. on a side opposite to the connecting portion 23. The second end surface member 42 is arranged on the side of the connecting portion 23 of the coil 2. Each of the first and second end surface members 41, 42 is a frame-like plate member including two through holes 43 provided along a stacking direction of the pair of winding portions 21, 22. The respective inner core portions 31, 32 are fit into the respective through holes 43.

Inclined surfaces along the inclination of the end surfaces of the respective winding portions 21, 22 are formed on surfaces of the first and second end surface members 41, 42 on the side of the coil 2. The respective inclined surfaces are in surface contact with the end surfaces of the respective winding portions 21, 22. The inclined surface of the first end surface member 41 is formed into a rectangular annular shape to surround the through hole 43 over the entire periphery. The inclined surface of the second end surface member 42 is formed into a U shape to surround three sides of the through hole 43. One recess 44 into which the outer core portion 33 is fit is formed in a surface of each of the first and second end surface members 41, 42 on the side of the outer core portion 33. An accommodating portion 45 for accommodating the connecting portion 23 of the coil 2 is formed in the upper surface of the second end surface member 42.

<Inner Member>

The holding member 4 may further include an inner member. The inner member is not shown. The inner member ensures insulation between the inner peripheral surfaces of the respective winding portions 21, 22 and the outer peripheral surfaces of the respective inner core portions 31, 32.

<Material>

Examples of the material of the holding member 4 include insulating materials such as various resins. The resins are, for example, those similar to the resins of the aforementioned composite material. Other thermoplastic resins are, for example, a polytetrafluoroethylene (PTFE) resin, a PBT resin, an ABS resin and the like. Other thermoplastic resins are, for example, an unsaturated polyester resin and the like. Particularly, the material of the holding member 4 is preferably the same material as the sealing resin portion 6. That is because linear expansion coefficients of the holding member 4 and the sealing resin portion 6 can be made equal and the damage of each member associated with shrinkage can be suppressed.

(Molded Resin Portion)

The assembly 10 may further include a molded resin portion 8 (FIG. 1). The molded resin portion 8 covers regions of the outer peripheral surfaces of the respective outer core portions 33 except coupling surfaces to the respective inner core portions 31, 32. The molded resin portion 8 extends to the insides of the pair of winding portions 21, 22. This molded resin portion 8 is interposed between the respective outer core portions 33 and the recesses 44 of the first and second end surface members 41, 42, between the outer peripheral surfaces of the respective inner core portions 31, 32 and the through holes 43 of the first and second end surface members 41, 42 and between the inner peripheral surfaces of the respective winding portions 21, 22 and the outer peripheral surfaces of the respective inner core portions 31, 32. The respective outer core portions 33, the first and second end surface members 41, 42, the respective inner core portions and the respective winding portions 21, 22 are integrated by this molded resin portion 8.

Thermosetting resins and thermoplastic resins similar to the resins of the aforementioned composite material can be, for example, utilized as the material of the molded resin portion 8. These resins may contain the aforementioned ceramic filler. If the ceramic filler is contained, the heat dissipation of the molded resin portion 8 is improved.

[Use Mode]

The reactor 1A can be utilized as a component of a circuit for performing a voltage stepping-up operation and a voltage stepping-down operation. The reactor 1A can be, for example, used as a constituent component of various converters and power converters. Examples of the converters include in-vehicle converters mounted in vehicles such as hybrid vehicles, plug-in hybrid vehicles, electric vehicles and fuel cell vehicles and converters of air conditioners. The in-vehicle converter is typically a DC-DC converter.

[Manufacturing]

The reactor 1A can be, for example, manufactured as follows. The assembly 10 formed by integrally assembling the coil 2, the magnetic core 3 and the holding member 4 by the molded resin portion 8 is accommodated into the case 5. Subsequently, the supporting portion 7 is fixed to the end surface of the short side portion 521 in the side wall portion 52 of the case 5 by the bolt 70. Subsequently, the constituent resin of the sealing resin portion 6 is filled into the case 5. In this example, the constituent resin of the sealing resin portion 6 is filled up to a height where the constituent resin contacts the lower surface of the supporting portion 7. Then, the constituent resin of the sealing resin portion 6 filled into the case 5 is cured.

Second Embodiment

[Reactor]

Figure 3:
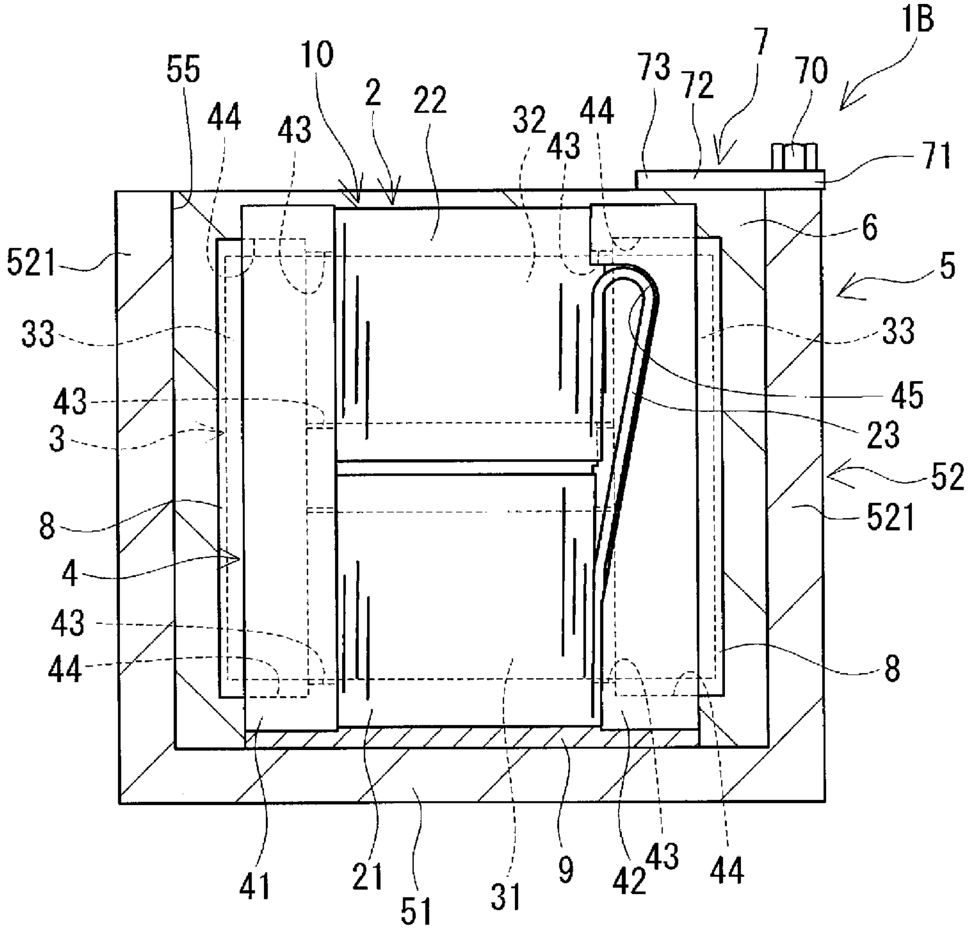
FIG. 3 is a side view schematically showing a reactor according to a second embodiment.

A reactor 1B according to a second embodiment is described with reference to FIG. 3. The reactor 1B according to the second embodiment differs from the reactor 1A according to the first embodiment in including an adhesive layer 9 for fixing an assembly 10 to a bottom plate portion 51 of a case 5. The following description is centered on points of difference. Similar components are not described.

(Adhesive Layer)

The adhesive layer 9 is interposed between the assembly 10 and the bottom plate portion 51. The assembly 10 is firmly fixed to the bottom plate portion 51 by the adhesive layer 9. Thus, a movement of the assembly 10 is easily restricted. Therefore, the detachment of the assembly 10 from the case 5 is easily effectively suppressed. Further, the heat dissipation of the assembly 10 is easily improved, depending on the material of the adhesive layer 9.

The adhesive layer 9 may be formed only in an entire region between a lower winding portion 21 and the bottom plate portion 51 of the case 5 or may be in a region from a first end surface member 41 to a second end surface member 42 across the lower winding portion 21 as in this example. In the case of this example, the lower winding portion 21 and the bottom plate portion 51 are fixed and, in addition, the first and second end surface members 41, 42 and the bottom plate portion 51 are fixed by the adhesive layer 9.

Examples of the material of the adhesive layer 9 include insulating resins. The adhesive layer 9 made of insulating resin enhances insulation between the lower winding portion 21 and the case 5. Examples of the insulating resins include thermosetting resins and thermoplastic resins. The thermosetting resins are, for example, an epoxy resin, a silicone resin, an unsaturated polyester resin and the like. The thermoplastic resins are, for example, a PPS resin, an LCP and the like. The insulating resin preferably contains the aforementioned ceramic filler and the like. That is because the heat dissipation of the adhesive layer 9 is easily enhanced. The higher the thermal conductivity of the adhesive layer 9, the more preferable. That is because the heat of the lower winding portion 21 is easily transferred to the case 5. The thermal conductivity of the adhesive layer 9 is, for example, preferably 0.3 W/m·K or higher, more preferably 1 W/m·K or higher and particularly preferably 2 W/m·K or higher.

[Functions and Effects]

The reactor 1B according to the second embodiment can provide effects similar to those provided by the reactor 1A according to the first embodiment. Moreover, the reactor 1B according to the second embodiment more easily suppresses the detachment of the assembly 10 from the case 5 than the reactor 1A according to the first embodiment. That is because the first and second end surface members 41, 42 and the lower winding portion 21 can be firmly fixed to the bottom plate portion 51 of the case 5 by including the adhesive layer 9.

Third Embodiment

[Reactor]

Figure 5:
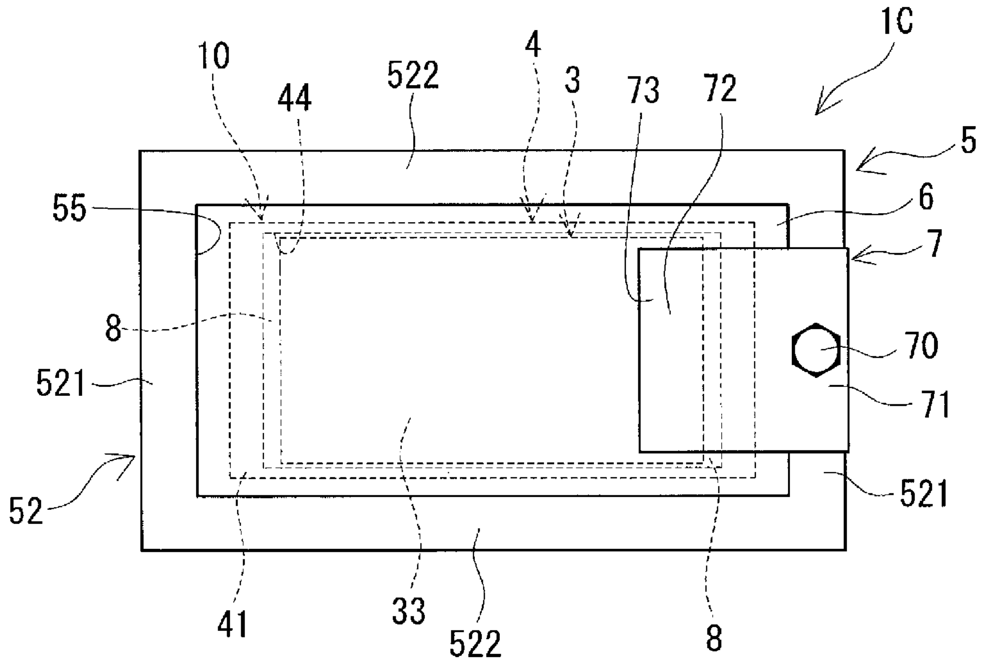
FIG. 5 is a top view schematically showing the reactor according to the third embodiment.

The reactor 1C according to the third embodiment is described with reference to FIGS. 4 and 5. The reactor 1C according to the third embodiment differs from the reactor 1A according to the first embodiment in that the arrangement mode of the pair of winding portions 21, 22 is the upright type. The following description is centered on points of difference. Similar components are not described.

(Coil)

The pair of winding portions 21, 22 are so arranged that the axes thereof are parallel to each other and orthogonal to a bottom plate portion 51. Out of four outer peripheral surfaces of each winding portion 21, 22, three surfaces except the one facing the opposite winding portion 22, 21 are facing a side wall portion 52 of a case 5. That is, out of a total of eight outer peripheral surfaces of the pair of winding portions 21, 22, six outer peripheral surfaces are facing the side wall portion 52 of the case 5. Since the facing surfaces facing the case 5, out of the total of eight outer peripheral surfaces of the pair of winding portions 21, 22, are a total of six outer peripheral surfaces, the heat of the coil 2 is easily dissipated via the side wall portion 52.

(Magnetic Core)

A pair of inner core portions 31, 32 are so arranged that the axes thereof are orthogonal to the bottom plate portion 51. Out of a pair of outer core portions 33, one outer core portion 33 is arranged on the side of the bottom plate portion 51. Further, out of the pair of outer core portions 33, the other outer core portion 33 is arranged on the side of an opening 55.

(Supporting Portion)

A supporting portion 7 is so provided that a longitudinal direction thereof extends along long side portions 522. Thus, the supporting portion 7 is orthogonal to an axial direction of the coil 2. An overlapping region 72 of the supporting portion 7 overlaps the upper surface of the upper outer core portion 33 (FIG. 5). A free end 73 overlaps the upper surface of the upper outer core portion 33. A cured sealing resin portion 6 is interposed between the lower surface of the overlapping region 72 and the lower surface of the free end 73 and the upper surface of the outer core portion 33 (FIG. 4). Thus, the lower surface of the overlapping region 72 and the lower surface of the free end 73 are not directly in contact with the upper surface of the outer core portion 33. The lower surface of the overlapping region 72 and the lower surface of the free end 73 are directly in contact with the upper surface of the sealing resin portion 6. That is, the overlapping region 72 and the free end 73 are not embedded in the sealing resin portion 6.

[Sizes]

A height of the reactor 1C is, for example, 80 mm or more and 150 mm or less. A width of the reactor 1C is, for example, 80 mm or more and 120 mm or less. The width of the reactor 1C is a length along the long side portions 522. A depth of the reactor 1C is, for example, 40 mm or more and 80 mm or less. The depth of the reactor 1C is a length along short side portions 521. In this example, a relationship of "(the depth of the reactor 1C)<(the height of the reactor 1C)<(the width of the reactor 1C)" is satisfied. That is, in this example, a relationship of "(the length of an assembly 10 along the depth direction)<(the length of the assembly 10 along the height direction)<(the length of the assembly 10 along the width direction)" is satisfied.

[Functions and Effects]

The reactor 1C according to the third embodiment can provide effects similar to those provided by the reactor 1A according to the first embodiment. Moreover, the reactor 1C according to the third embodiment provides the following effects as compared to the reactor 1A according to the first embodiment.

(1) The height of the reactor 1C can be reduced. That is because the length of the assembly 10 along the width direction is longer than the length of the assembly 10 along the height direction.

(2) Noise is easily suppressed. The reason for that is as follows. The assembly 10 easily vibrates in the axial direction of the coil 2. The reactor 1C can be so arranged that the supporting portion 7 is orthogonal to the axial direction of the coil 2 since the pair of winding portions 21, 22 are of the upright type. Thus, the supporting portion 7 can support the assembly 10 from a direction to suppress an amplitude of the assembly 10. Therefore, the vibration of the assembly 10 is easily absorbed by the supporting portion 7.

(3) Heat dissipation is excellent. That is because many of the outer peripheral surfaces of the pair of winding portions 21, 22 are the facing surfaces facing the case 5. In the pair of winding portions 21, 22 of the upright type, the facing surfaces facing the case 5, out of the outer peripheral surfaces of the pair of the winding portions 21, 22, are a total of six surfaces as described above. In contrast, if the pair of winding portions 21, 22 are of the vertically stacked type as in the reactor 1A according to the first embodiment (FIG. 1), the facing surfaces facing the case 5, out of the outer peripheral surfaces of the pair of the winding portions 21, 22, are a total of five surfaces as described above.

Fourth Embodiment

[Reactor]

Figure 6:
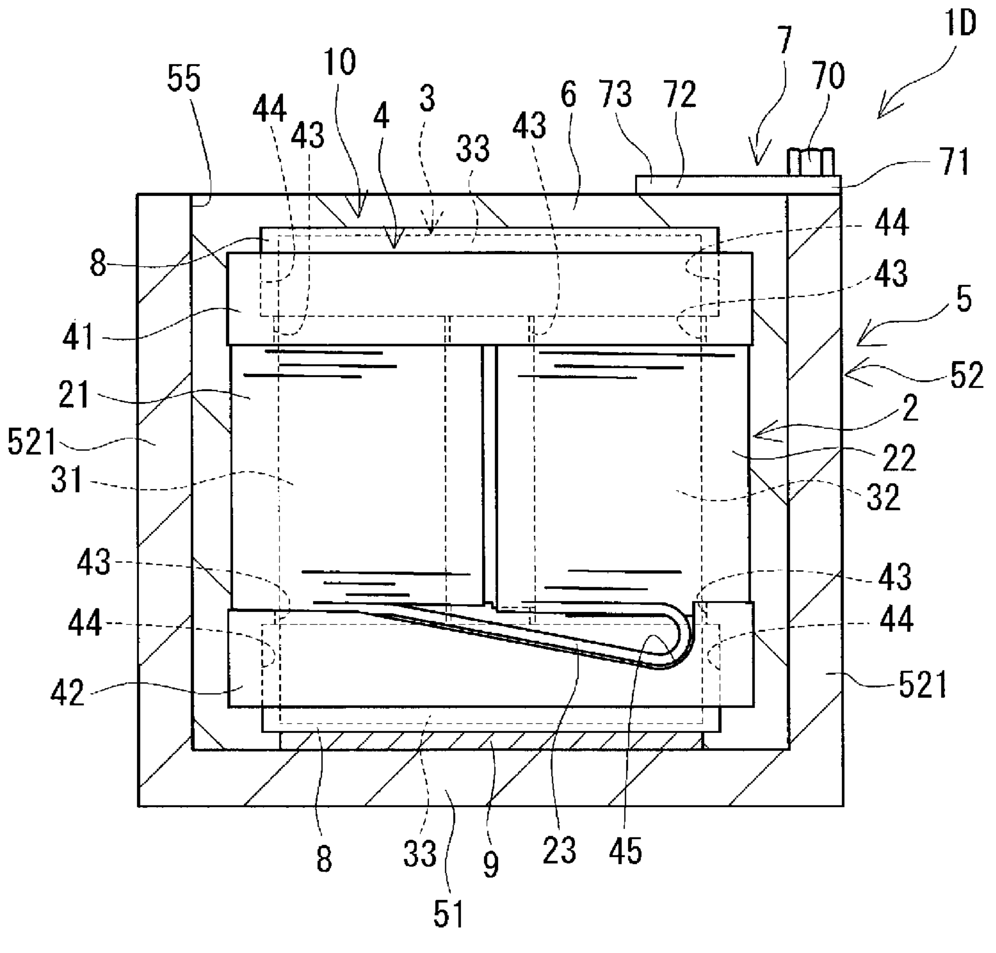
FIG. 6 is a side view schematically showing a reactor according to a fourth embodiment.

A reactor 1D according to a fourth embodiment is described with reference to FIG. 6. The reactor 1D according to the fourth embodiment differs from the reactor 1A according to the first embodiment in a pair of winding portions 21, 22 being of the upright type and in including an adhesive layer 9 for fixing an assembly 10 to a bottom plate portion 51 of a case 5. That is, the reactor 1D according to the fourth embodiment differs from the reactor 1C according to the third embodiment in including the adhesive layer 9. The following description is centered on points of difference from the third embodiment. Components similar to those of the third embodiment are not described.

(Adhesive Layer)

The adhesive layer 9 is interposed between a lower outer core portion 33 and the bottom plate portion 51. The adhesive layer 9 is formed in an entire region between the lower outer core portion 33 and the bottom plate portion 51 in this example. In this example, the lower outer core portion 33 and the bottom plate portion 51 of the case 5 are fixed by adhering a molded resin portion 8 and the bottom plate portion 51 by the adhesive layer 9. The material of the adhesive layer 9 is as described above in the third embodiment.

[Functions and Effects]

The reactor 1D according to the fourth embodiment can provide effects similar to those provided by the reactor 1C according to the third embodiment. Moreover, the reactor 1D according to the fourth embodiment more easily suppresses the detachment of the assembly 10 from the case 5 than the reactor 1C according to the third embodiment. That is because the lower outer core portion 33 can be firmly fixed to the case 5 by including the adhesive layer 9.

The present invention is not limited to these illustrations and is intended to be represented by claims and include all changes in the scope of claims and in the meaning and scope of equivalents.

LIST OF REFERENCE NUMERALS

1A, 1B, 1C, 1D reactor
10 assembly
2 coil
21, 22 winding portion
23 connecting portion
3 magnetic core
31, 32 inner core portion
33 outer core portion
4 holding member
41 first end surface member
42 second end surface member
43 through hole
44 recess
45 accommodating portion
5 case
51 bottom plate portion
52 side wall portion
521 short side portion
522 long side portion
55 opening
6 sealing resin portion
7 supporting portion
70 bolt
71 fixed end
72 overlapping region
73 free end
8 molded resin portion
9 adhesive layer

What is claimed is:

1. A reactor, comprising:

an assembly of a coil and a magnetic core;

a case for accommodating the assembly inside;

a sealing resin portion for at least partially sealing the assembly by being filled into the case; and a supporting portion to be fixed to the case in a cantilever manner, wherein:

the case includes a bottom plate portion, the assembly being placed on the bottom plate portion, and a side wall portion in the form of a rectangular frame for surrounding an outer periphery of the assembly, the side wall portion includes a pair of short side portions and a pair of long side portions having different lengths along a circumferential direction of the case, the coil includes a pair of winding portions, the pair of winding portions are stacked in a direction orthogonal to the bottom plate portion and have axes parallel to each other, the magnetic core includes a pair of outer core portions to be arranged outside the coil, the supporting portion includes a fixed end to be fixed to an end surface of one of the pair of short side portions of the side wall portion, an overlapping region configured to overlap an outer core portion located at a side of the supporting portion, of the pair of outer core portions from above, and a free end not to be fixed to the case, the overlapping region extends along the long side portions of the side wall portion, the free end is provided on a side opposite to the fixed end, and the sealing resin portion is interposed between the free end of the supporting portion and the outer core portion to prevent the free end from directly contacting the outer core portion.

2. The reactor of claim 1, wherein:

the coil includes a connecting portion electrically connecting the pair of winding portions, the connecting portion is provided on one axial end side of the coil, and the fixed end of the supporting portion is fixed to the end surface of a short side portion located on a side of the connecting portion of the coil, of the pair of short side portions in the case.

3. The reactor of claim 1, wherein the sealing resin portion is interposed between the overlapping region of the supporting portion and the outer core portion.

4. The reactor of claim 1, comprising an adhesive layer for fixing the assembly and the bottom plate portion of the case by being interposed between the assembly and the bottom plate portion of the case.

5. The reactor of claim 1, wherein:

the assembly includes a molded resin portion for covering the outer core portions, and the molded resin portion extends to the insides of the pair of winding portions.

6. The reactor of claim 1, wherein:

the pair of short side portions are higher in rigidity than the pair of long side portions.

7. The reactor of claim 1, wherein:

an upper surface of the side wall portion is higher than an upper surface of the sealing resin portion.

8. The reactor of claim 1, wherein:

the supporting portion is in the form of such a flat plate that the fixed end, the overlapping region, and the free end are substantially parallel to an end surface of the pair of short side portions.

9. A reactor, comprising:

an assembly of a coil and a magnetic core;

a case for accommodating the assembly inside;

a sealing resin portion for at least partially sealing the assembly by being filled into the case; and a supporting portion to be fixed to the case in a cantilever manner, wherein:

the case includes a bottom plate portion, the assembly being placed on the bottom plate portion, and a side wall portion in the form of a rectangular frame for surrounding an outer periphery of the assembly, the side wall portion includes a pair of short side portions and a pair of long side portions having different lengths along a circumferential direction of the case, the coil includes a pair of winding portions, the pair of winding portions have axes orthogonal to the bottom plate portion and parallel to each other, the magnetic core includes a pair of outer core portions to be arranged outside the coil, the supporting portion includes a fixed end to be fixed to an end surface of one of the pair of short side portions of the side wall portion, an overlapping region configured to overlap an upper outer core portion of the pair of outer core portions from above, and a free end not to be fixed to the case, the overlapping region extends along the long side portions of the side wall portion, the free end is provided on a side opposite to the fixed end, and the sealing resin portion is interposed between the free end of the supporting portion and the outer core portion to prevent the free end from directly contacting the outer core portion.

10. The reactor of claim 9, wherein the sealing resin portion is interposed between the overlapping region of the supporting portion and the outer core portion.

11. The reactor of claim 9, comprising an adhesive layer for fixing the assembly and the bottom plate portion of the case by being interposed between the assembly and the bottom plate portion of the case.

12. The reactor of claim 9, wherein:

the assembly includes a molded resin portion for covering the outer core portions, and the molded resin portion extends to the insides of the pair of winding portions.

* * * * *